United States Patent
Shaw et al.

(10) Patent No.: US 11,281,946 B2
(45) Date of Patent: Mar. 22, 2022

(54) COVERT MARKING

(71) Applicant: HEWLETT-PACKARD DEVELOPMENT COMPANY, L.P., Spring, TX (US)

(72) Inventors: Mark Shaw, Boise, ID (US); Kenneth Scott Line, Boise, ID (US); Kimin Kang, SuWon-Si (KR); Hae-Kee Lee, SuWon-Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,177

(22) PCT Filed: Aug. 1, 2018

(86) PCT No.: PCT/US2018/044816
§ 371 (c)(1),
(2) Date: Oct. 10, 2019

(87) PCT Pub. No.: WO2020/027827
PCT Pub. Date: Feb. 6, 2020

(65) Prior Publication Data
US 2021/0383177 A1 Dec. 9, 2021

(51) Int. Cl.
*G06K 15/02* (2006.01)
*G06K 15/12* (2006.01)
(Continued)

(52) U.S. Cl.
CPC .......... *G06K 15/1209* (2013.01); *B41J 2/442* (2013.01); *B41J 2/47* (2013.01); *B41J 2/471* (2013.01);
(Continued)

(58) Field of Classification Search
CPC ............ G06K 15/029; G06K 15/1209; G06K 15/1276; G06K 15/128; B41J 2/442; B41J 2/47; B41J 2/4753; B41J 2/52
See application file for complete search history.

(56) References Cited

U.S. PATENT DOCUMENTS 6,700,995 B2    3/2004    Reed
6,763,124 B2    7/2004    Alattar et al.
(Continued)

FOREIGN PATENT DOCUMENTS

CN          1118898        3/1996
CN          1445711        10/2003
(Continued)

*Primary Examiner* — Matthew Luu
*Assistant Examiner* — Kendrick X Liu
(74) *Attorney, Agent, or Firm* — Brooks Cameron & Huebsch PLLP

(57) ABSTRACT

Examples described herein relate to a system consistent with the disclosure. For instance, the system may comprise a printing device including hardware to form an image on a print medium, a memory resource, and a controller to receive a print job to form the markings on the print medium, designate a pixel of the received print job to form a covert dot pattern on the markings, where the pixel corresponds to a first laser intensity level; and adjust a laser intensity of the printing device to a second laser intensity level based on the first laser intensity level of the designated pixel to form the covert dot pattern.

15 Claims, 4 Drawing Sheets

(51) Int. Cl.
*B41J 2/44* (2006.01)
*B41J 2/47* (2006.01)
*B41J 2/475* (2006.01)
*B41J 2/52* (2006.01)

(52) U.S. Cl.
CPC .............. *B41J 2/4753* (2013.01); *B41J 2/52* (2013.01); *G06K 15/029* (2013.01); *G06K 15/128* (2013.01); *G06K 15/1276* (2013.01); *G06K 15/1813* (2013.01)

(56) References Cited

U.S. PATENT DOCUMENTS

| | | |
|---|---|---|
| 7,063,264 B2 | 6/2006 | Bi et al. |
| 7,554,699 B2 | 6/2009 | Wang et al. |
| 8,144,368 B2 | 3/2012 | Rodriguez et al. |
| 8,947,744 B2 | 2/2015 | Kurtz et al. |
| 9,667,828 B2 | 5/2017 | Nakano et al. |
| 2006/0072778 A1 | 4/2006 | Harrington |
| 2009/0129592 A1 | 5/2009 | Swiegers |
| 2009/0134227 A1* | 5/2009 | Roth ................. G06K 19/14 235/491 |
| 2013/0323476 A1* | 12/2013 | Farrell ................ B29C 66/306 428/195.1 |
| 2014/0132694 A1 | 5/2014 | Shacham et al. |
| 2016/0318310 A1* | 11/2016 | Song ........................ B41M 5/24 |

FOREIGN PATENT DOCUMENTS

| | | |
|---|---|---|
| CN | 1604137 | 4/2005 |
| CN | 101336440 | 12/2008 |
| CN | 101918224 | 12/2010 |
| CN | 103718189 | 4/2014 |
| CN | 107428187 | 12/2017 |
| EP | 0556321 B1 | 7/1996 |
| EP | 2739785 | 4/2016 |
| JP | 2000092308 | 3/2000 |
| JP | 2005039448 | 2/2005 |
| JP | 2013070221 | 4/2013 |

* cited by examiner

COVERT MARKING

BACKGROUND

Imaging systems such as printers, copiers, etc. may be used to form markings on a print medium, such as text, images, etc. Imaging systems may form markings on the print medium and/or form a three-dimensional object by employing a print substance such as an ink, toner, and/or a three-dimensional printing substance such as three-dimensional printing powders, etc.

DETAILED DESCRIPTION

Printing devices may form markings on a print medium (e.g., paper, photopolymers, plastics, composite, metal, wood, etc.) by transferring a print substance (e.g., ink, toner, etc.) to print medium. The printing devices may render the page description language of a print job to form markings on the print medium. In addition, the printing devices may form covert markings on print media while forming a physical representation of text, images, models, etc. on print medium. As used herein, the term "printing device" refers to a hardware device with functionalities to physically produce representation(s) of text, images, models, etc. on a physical print medium. Examples of printing devices may include printing devices such as ink/toner printers and/or three-dimensional printers, among other types of printing devices.

The printing devices may transfer covert markings, such as a dot pattern, on a print medium during the printing process by transferring colored covert markings that are barely visible. For example, the covert marking may be hidden using a yellow channel. However, a monochrome printing device is not configured to transfer colored covert markings. Additionally, attempting to hide dot patterns using a black channel can cause the visibility of the dot patterns to be evident.

As such, covert dot patterns, as described herein, are formed on both image and non-image portions of print medium using laser intensity modulation to adjust the grayscale of the covert dot patterns. Accordingly, this disclosure describes covert dot patterns that are produced by designating a pixel of a received print job to form a covert dot pattern on an image, where the pixel corresponds to a first laser intensity level and adjusting a laser intensity of the printing device to a second laser intensity level based on the first laser intensity level of the designated pixel to form the covert dot pattern.

Figure 1:
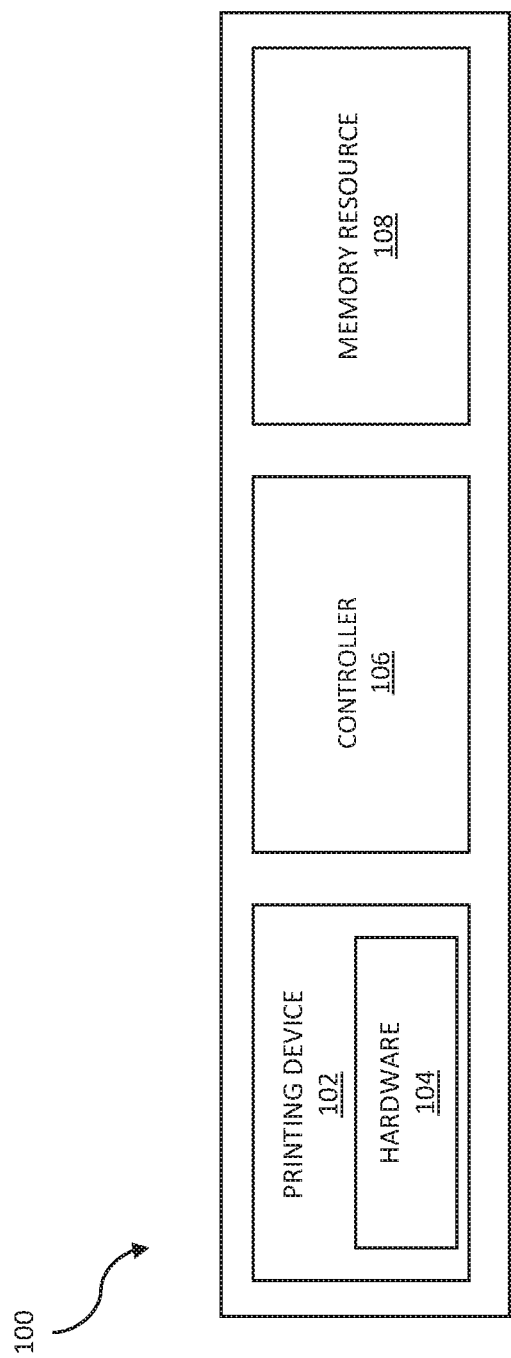
FIG. 1 illustrates an example system consistent with the disclosure.

FIG. 1 illustrates an example of a system 100 consistent with the disclosure. The system 100 may be implemented in a variety of imaging systems, such as printers, copiers, etc., for example. In some examples, the system 100 may include a printing device 102 including hardware 104 to form markings and/or representation(s) on print medium. The printing device 102 may utilize the hardware 104 to deposit print substance on print medium to form markings and/or physical representations on the print medium. As used herein "print medium" refers to an individual paper, photopolymer, plastic, composite, metal, wood, or other material on which markings may be formed to make up a physical representation of the output of a print job or a portion of an output of a print job. As used herein, the term "print job" refers to signals or states, which may be stored in a file and/or a set of files, usable to instruct a printing device in forming markings such as text, images, etc. on print media and/or objects such as three-dimensional object.

The printing device may be a monochrome printer. A monochrome printer is configured to print markings on print medium, where the markings consist of black print material (e.g., ink) only. Adjusting the laser intensity of a monochrome printer may allow for grayscale (e.g., black or gray) markings to be printed on the print material. A laser intensity level may correspond to a grayscale marking that the printing device will print. Thus, an existing pixel laser intensity level can be adjusted to a different laser intensity level to change the grayscale of the existing pixel to a different grayscale. For example, an existing white pixel (e.g., a non-image pixel) may be changed to a black or gray pixel by adjusting the laser intensity level of the pixel. The marking that is printed by the printing device can include the pixel with the altered laser intensity level. In another example, an existing black pixel (e.g., an image pixel) can be changed to a lighter shade or white pixel by adjusting the laser intensity level of the pixel. Again, the marking that is printed by the printing device can include the pixel with the altered intensity level.

In some examples, the system 100 may include a memory resource 132 to store information. The memory resource 132 may store a laser intensity level conversion table for the system 100. In some examples, the laser intensity level conversion table stored in the memory device 132 may assist the printing device 102 in forming covert dot patterns on print medium. In some examples, covert dot patterns are formed by converting an existing pixel laser intensity level to a different laser intensity level based on the information in the laser intensity level conversion table. Each pixel used to form the markings and/or representation(s) may have a threshold laser intensity level value. The threshold laser intensity level value may be used to determine a corresponding laser intensity level in the laser intensity level conversion table. For example, the laser intensity level conversion table may cause the printing device to produce a different laser intensity level based on the threshold laser intensity level value of the pixel. That is, the threshold laser intensity level value of the pixel is inputted into the laser intensity level conversion table and the new laser intensity level of the pixel is determined based on the output value of the laser intensity level conversion table.

In some examples, the system 100 may include a controller 106. The controller 106 may receive a print job to form markings and/or representation(s) on print medium. The controller 106 may cause the hardware 104 included in the printing device 102 to form covert dot patterns while forming markings and/or representation(s) on print medium. As used herein, "covert dot patterns" refers to a pattern of dots throughout a sheet of print medium that is not easily detected by an unaided human eye. That is, the controller 106 may alter the markings and/or representation(s) of the print job to include covert dot patterns. For examples, the laser intensity level of a select group of pixels of the markings and/or representation(s) may be altered and/or changed to create the covert dot pattern. In some examples, the covert dot patterns included in the markings and/or representation(s) may not be easily detected with an unaided human eye.

In some examples, the controller 106 may render the page description language of the print job to form markings and/or representation(s) on print medium. In some examples, a page description language of the print job may be rendered before the printing device 102 forms markings and/or representation(s) on print medium. The page description language may specify the arrangement of a printed page through commands from a computing device. As used herein, "page description language" refers to a computer language that describes the appearance of the markings and/or representation(s) formed on the print medium. In some examples, the controller 106 rendering the page description language of the print medium may assist the printing device in forming markings and/or physical representations on the print medium. The controller 106 may perform an individual rendering of the page description language per print job.

In some examples, the controller 106 may determine the object type image of the markings and/or representation(s) that may be printed on the print medium. In some examples, the controller 106 may determine the object type image for each print medium of the print job. The controller 106 may determine the object type image once for the entire print job. In some examples, the controller 106 may determine the object type image for the print job after the page description language is rendered. That is, the controller 106 may utilize the rendered page description language to determine the object type image of the print job. As used herein, "object type image" refers to the description of a pixel that states what type of markings the pixels making up the markings will produce. For example, the pixel may be used to create a communicative text, a vector, and/or a raster content. In some examples, once the object type image is determined for the print job pixels that form the markings may be designated to create a covert dot pattern.

For example, the controller 106 may designate certain pixels of the determined object type image to form a covert dot pattern on the markings and/or representation(s). For instance, the controller 106 may specify which pixels of the markings and/or representation(s) will create the covert dot pattern, thereby producing a unique pattern. In addition, the controller 106 may determine the unique portion of the covert dot pattern one time per the entire print job to increase the performance of the printing process. In some examples, the controller 106 may designate pixels to form a covert dot pattern before the monochrome data is rendered. That is, determining the covert dot pattern before the monochrome data is rendered may allow for a faster printing process as compared to determining the covert dot pattern after the monochrome data is rendered. As used herein, "printing process" refers to process of transferring print substance to a print medium and/or forming a three-dimensional object using three-dimensional printing substance. In some examples, the controller 106 may store the information from the designated pixels on the memory resource 108 to recreate the covert dot pattern. For instance, the controller 106 may cause hardware 104 to repeatedly embed and/or stamp the covert dot pattern into each sheet of print medium of the print job without any additional performance impact to the printing device 102. In some examples, the system 100 may use existing hardware 104 to embed the covert dot pattern into the markings and/or representation(s) printed on the print medium. As used herein, "designated pixel" refers to a particular pixel chosen and/or appointed by the controller.

In some examples, the controller 106 may designate certain pixels of the determined object type image to form a covert dot pattern instead of the markings and/or representation(s). For instance, the controller 106 may replace object type information with covert dot pattern information resulting in the covert dot pattern being formed and not the markings/representation(s) within the designated pixel. In such an example, the covert dot pattern may be printed on non-image portions of print medium.

In some examples, the controller 106 may adjust the laser intensity levels of the designated pixels to form the covert dot pattern on the markings and/or representation(s) formed on the print medium. The designated pixels may be adjusted using the laser intensity level conversion table stored on the memory resource 108. That is, the laser intensity level conversion table may include information to adjust laser intensity levels of the designated pixels based on the threshold laser intensity level value of the designated pixels. For instance, each pixel of the designated pixels may include a threshold laser intensity level value that may be inputted into the laser intensity level conversion table to determine the adjusted laser intensity level of the pixel to form the covert dot pattern in the markings. In some examples, the controller 106 may adjust the laser intensity levels of the designated pixels individually based on the laser intensity level conversion table and an individual threshold value of each pixel of the designated pixels. The covert dot pattern may be embedded into the object type image as the markings and/or representation(s) are printed on the print medium. As used herein, "adjusted laser intensity level" refers to an altered or changed laser intensity level.

Although controller 106 is illustrated in FIG. 1 as being included in system 100, examples of the disclosure are not so limited. For example, controller 106 may be remote from system 100 and/or printing device 102 and may communicate with system 100 and/or printing device 102 via a network relationship, such as a wired or wireless network.

Figure 2:
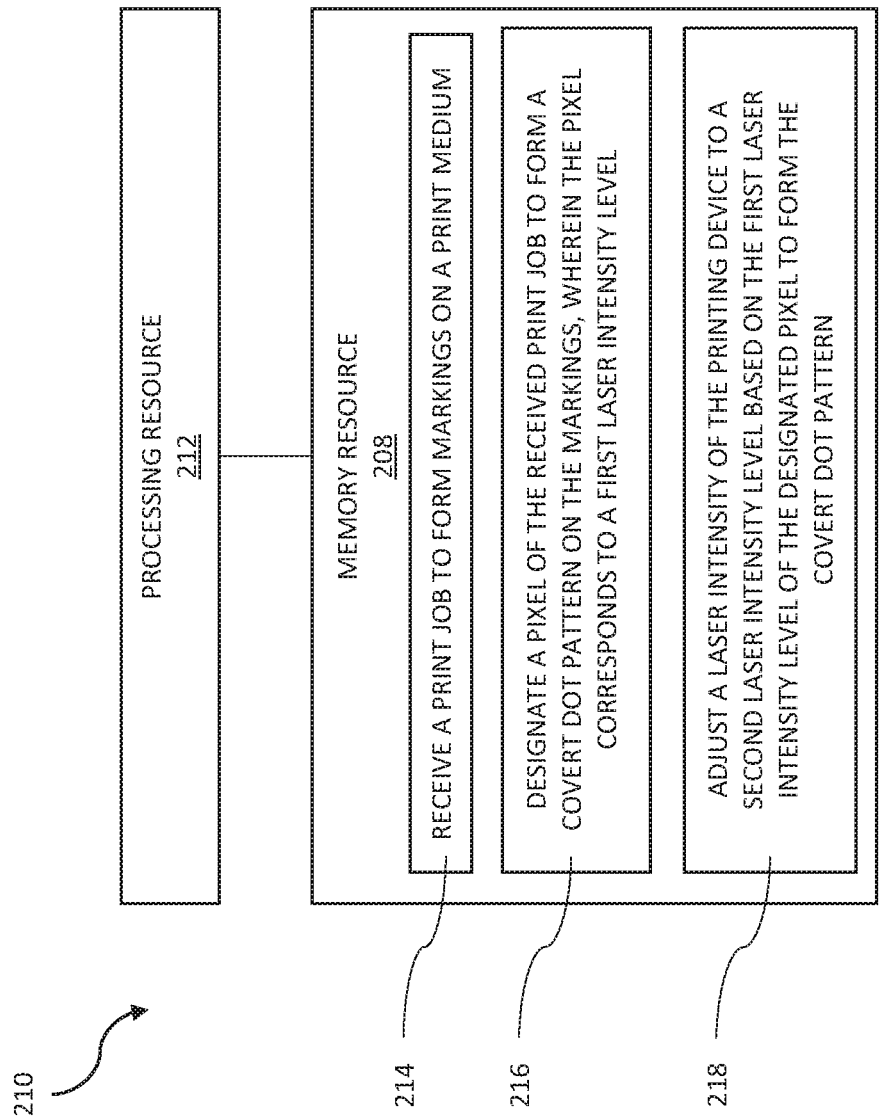
FIG. 2 illustrates an example of a printing device consistent with the disclosure.

FIG. 2 illustrates an example of an apparatus 210 suitable with a system consistent with the disclosure. As illustrated in FIG. 2, the apparatus 210 includes a processing resource 212 and a memory resource 208. The processing resource 212 may be a hardware processing unit such as a microprocessor, application specific instruction set processor, coprocessor, network processor, or similar hardware circuitry that may cause machine-readable instructions to be executed. In some examples, the processing resource 212 may be a plurality of hardware processing units that may cause machine-readable instructions to be executed. The processing resource 331 may include central processing units (CPUs) among other types of processing units. The memory resource 208 may be any type of volatile or non-volatile memory or storage, such as random-access memory (RAM), flash memory, read-only memory (ROM), storage volumes, a hard disk, or a combination thereof.

The memory resource 208 may store instructions thereon, such as instructions 214, 216, and 218. When executed by the processing resource 212, the instructions may cause the apparatus 210 to perform specific tasks and/or functions. For example, the memory resource 208 may store instructions 214 which may be executed by the processing resource 212 to cause the apparatus 210 to receive a print job to form markings and/or representation(s) on a print medium. In some examples, a controller may receive a print job containing information about the markings and/or representation(s) that are to be formed on print medium. In some examples, the print job information may inform the controller of the type of markings and/or representation(s) that are to be produced, the laser intensity level of the pixels that will make up the markings and/or representation(s), and how many sheets of print medium will create the markings and/or representation(s), amongst other possibilities. That is, the controller may receive information to create the markings and/or representation(s) when the controller receives the print job.

Additionally, the memory resource 208 may store instructions which may be executed by the processing resource 212 to cause the apparatus 210 to determine the object type image by rendering a page description language of the print job. In some examples, when the page description language of a print job is rendered the object type image may be determined. The object type image may include information as to the type of markings and/or representation(s) the printing device is to produce. In some examples, the controller may render the page description language for a print job once. In addition, the object type image for the print job may be determined once for the print job. In some examples, the laser intensity level of the pixels may be determined when the object type image is determined.

The memory resource 208 may store instructions 216 which may be executed by the processing resource 218 to cause the apparatus 210 to designate a pixel of the received print job to form a covert dot pattern on the markings and/or representation(s), where the pixel corresponds to a first laser intensity level. As described herein, the laser intensity level may correspond to a grayscale, such as black, white, or a shade of gray. In some examples, determining the object type image may allow the controller to determine the pixels that will have an adjusted laser intensity level. For instance, to form a covert dot pattern the controller may use the laser intensity level information in the object type imaged to determine which pixels will receive the adjusted laser intensity level and what the adjusted laser intensity level of the pixels will be. In some examples, the controller may individually determine the adjusted laser intensity level of the designated pixels when determining the pixels to form the covert dot pattern.

The memory resource 208 may store instructions 218 which may be executed by the processing resource 212 to cause the apparatus 210 to adjust a laser intensity of the printing device to a second laser intensity level based on the first laser intensity level of the designated pixel to form the covert dot pattern. In some examples, the designated pixels may be converted into the covert dot pattern by adjusting laser intensity levels of the designated pixels. That is, the laser intensity levels of the designated pixels may be adjusted to produce a covert dot pattern. The laser intensity levels of the designated pixels may be adjusted as the printing device prints markings on the print medium. In some examples, the adjusted laser intensity level of the designated pixel may not be detected by an unaided human eye when next to other pixels. In addition, the controller may determine the adjusted laser intensity level of the designated pixel based on the laser intensity level that surround the pixel.

Figure 3:
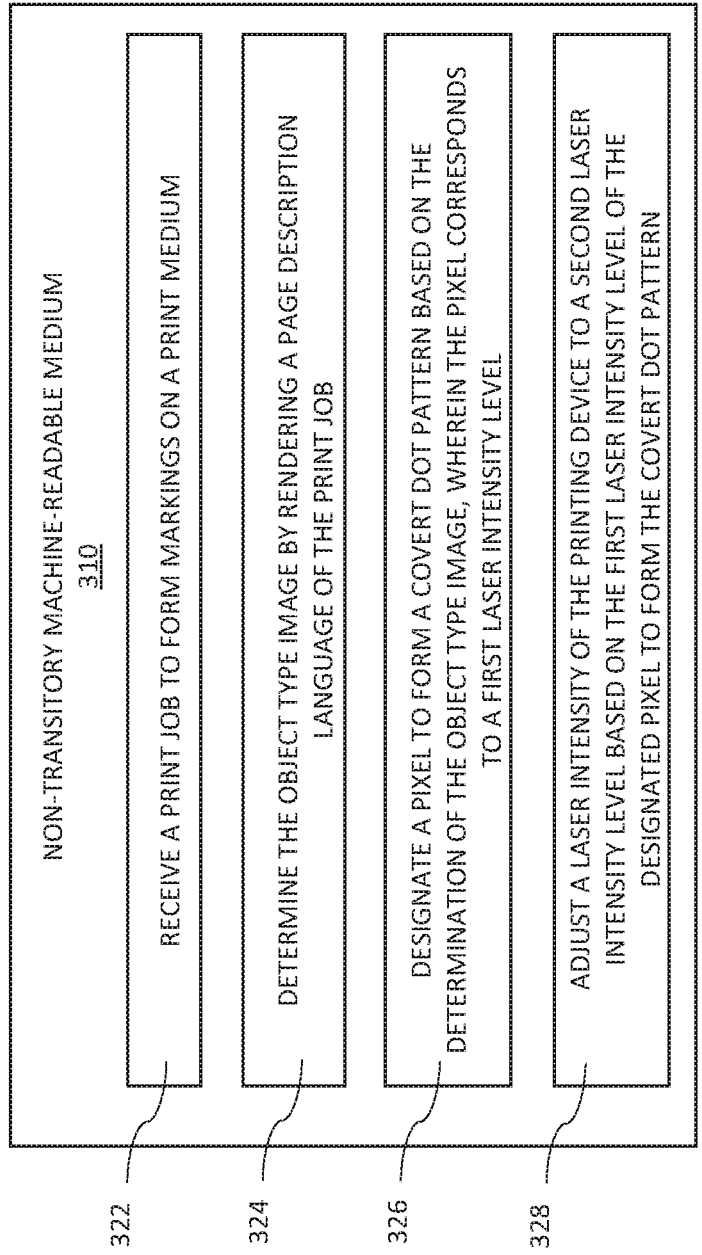
FIG. 3 illustrates an example diagram of a non-transitory machine readable medium suitable with a system for covert marking consistent with the disclosure

FIG. 3 illustrates an example diagram of a non-transitory machine readable medium 310 suitable with a system consistent with the disclosure. The non-transitory machine-readable medium 310 may be any type of volatile or non-volatile memory or storage, such as random-access memory (RAM), flash memory, read-only memory (ROM), storage volumes, a hard disk, or a combination thereof.

The medium 310 stores instructions 322 executable by a processing resource to receive a print job to form markings on a print medium. The information from the print job may provide usable instruction for forming the markings and/or representation(s) on print medium, Receiving the print job may allow the printing device to create the markings and/or representation(s), In some examples, the markings and/or representation(s) of the print job may be altered to form covert markings on the print medium. In addition, a human eye may not be able to detect the altered pixels without assistance from a device and/or magnifying the print medium.

The medium 310 stores instructions 324 executable by a processing resource to determine an object type image by rendering a page description language of the print job. In some examples, the page description language of the print job may be rendered to form markings and/or representation(s) on print medium. The page description language of the print job may be rendered before the printing device forms markings and/or representation(s) on the print medium. In addition, the controller may determine the object type image for the print job after the page description language is rendered. In some examples, pixels may be designated to create a covert dot pattern once the object type image is determined. In some examples, the object type image may be determined before the monochrome data is rendered.

The medium 310 stores instructions 326 executable by a processing resource to designate a pixel to form a covert dot pattern based on the determination of the object type image, where the pixel corresponds to a first laser intensity level. In some examples, pixels of the object type image may be used to create the covert dot pattern. All of the pixels of the object type image may not be used to form the covert dot pattern. That is, only designated pixels of the object type image may create the covert dot pattern and the controller may determine the pixel to create the covert dot pattern.

The medium 310 stores instructions 328 executable by a processing resource to adjust a laser intensity of the printing device to a second laser intensity level based on the first laser intensity level of the designated pixel to form the covert dot pattern. The first laser intensity level can be greater than the second laser intensity level. For example, if the designated pixel is originally a laser intensity level that corresponds to black, the laser intensity level can be decreased to change the laser intensity to a level that the human eye cannot detect. In another example, the second laser intensity level can be greater than the first laser intensity level. In such an example, if the designated pixel is originally a laser intensity level that corresponds to white (e.g., a non-image pixel), the laser intensity level can be increased to change the laser intensity to a level that the human eye cannot detect. As described herein, the second laser intensity level is based on the first laser intensity level that is input into the laser intensity level conversion table.

In some examples, the designated pixels are converted into covert dot pattern as the image is printed. The controller may convert the designated pixel by adjusting the laser intensity level of pixel and embedding the adjusted laser intensity level into the object type image. Adjusting the embedded laser intensity level into the object type image may create a covert dot pattern. In some examples, the controller may embed the covert dot pattern into the object type image at the same time as printing.

Figure 4:
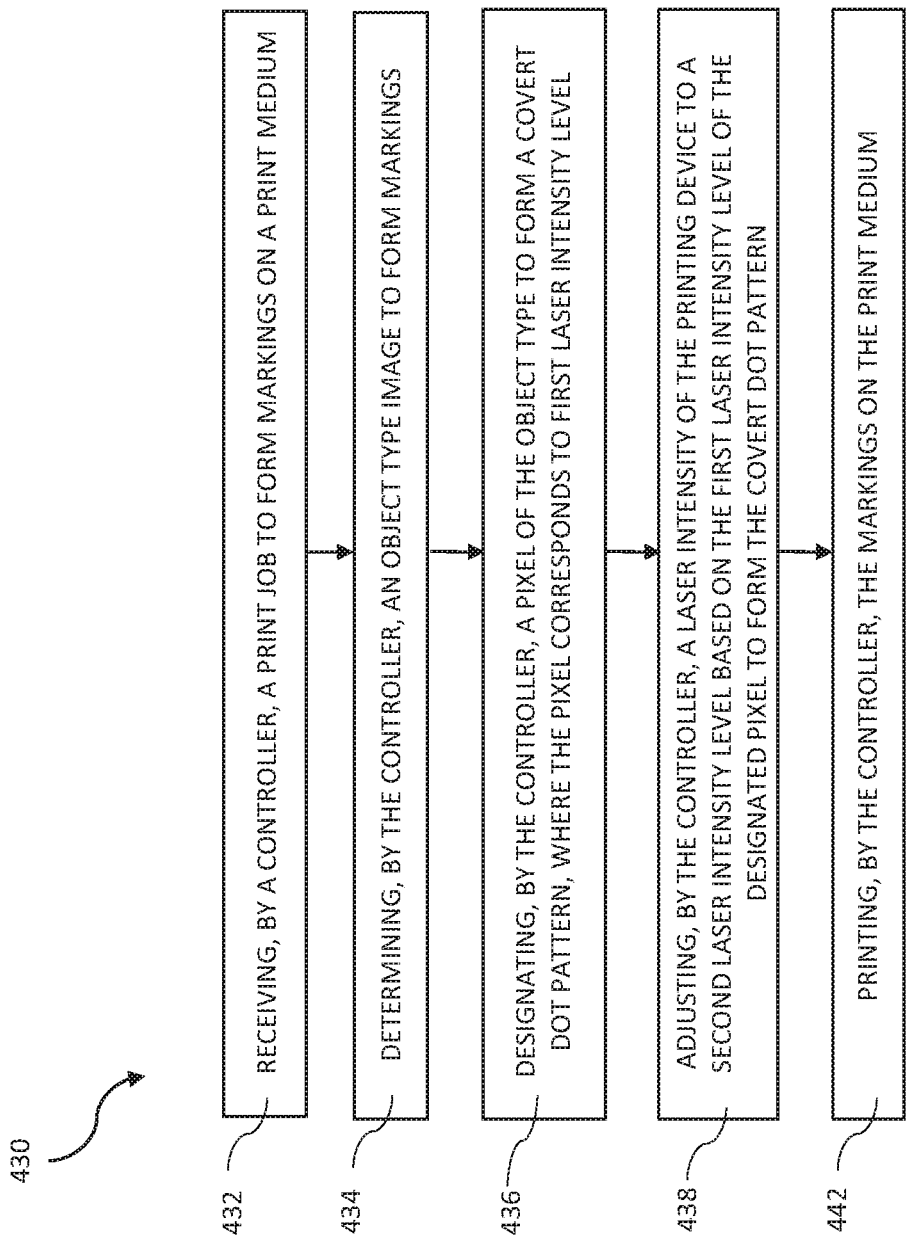
FIG. 4 illustrates an example of a method for covert marking consistent with the disclosure.

FIG. 4 illustrates an example of a method 430 consistent with the disclosure. Method 430 may be performed, for example, by a controller (e.g., controller 106, described in FIG. 1) of a system (e.g., system 100, described in FIG. 1).

At 432, the method 430 may include receiving, by the controller, a print job to form markings on a print medium. The printing device may be a monochrome printer configured to form grayscale markings and/or representation(s) on the print medium. Additionally, the printing device may render page description language of the print job to form the image. When the printing device receives a print job the hardware included in the printing device may create the covert dot patterns on the print medium. The pixels that form the markings and/or representation(s) may be altered to create the covert dot pattern. However, before the pixels that create the markings and/or representation(s) are altered the controller may render the page description language for the print job. That is, the controller may determine the arrangement of the objects that will be formed on the print medium. In some examples, the print job may render the page description language once during the entire print job. The rendered page description language may be used to determine the object type image of the markings and/or representation(s).

At 434, the method 430 may include determining, by the controller, an object type image to form markings. In some examples, the object type image may be determined after the page description language of the print job is rendered. In addition, the controller may determine the object type image based on the rendered page description language. With the object type image the controller may be able to determine the laser intensity level of the pixels that make up the markings and/or representation(s) and the type of markings that may be produced. That is, determining the object type image may determine if the markings and/or representation(s) include communicative text, vector, and/or raster content. In addition, determining the object type image may determine the laser intensity level of each individual pixel of the markings. In some examples, the object type may be determined once for a print job. That is, the controller may determine the object type for each print medium of the print job once for the entire print job.

At 436, the method 430 may include designating, by the controller, a pixel of the object type to form a covert dot pattern, where the pixel corresponds to first laser intensity level. In some examples, the controller may designate pixels based on the object type image to form a covert dot pattern. That is, the controller may determine which pixels of the object type image will form the covert dot pattern by picking the pixels that will have an adjusted laser intensity level. In some examples, the controller may determine the pixels to make up the covert dot pattern before the monochrome data is rendered. In some examples, the controller may store the information to create the covert dot pattern in the memory resource (e.g., memory resource 132 of FIG. 1). The information stored on the memory resource may be used to create covert dot patterns on other sheets of print medium. In some examples, reusing the determined covert dot pattern may create a quick printing process.

At 438, the method 430 may include adjusting, by the controller, a laser intensity of the printing device to a second laser intensity level based on the first laser intensity level of the designated pixel to form the covert dot pattern. In some examples, the covert dot pattern is embedded into the object type image, That is, the laser intensity level of the designated pixels are adjusted and/or changed to create the covert dot pattern in the markings and/or representation(s). For instance, designated pixels of the object type image may be adjusted to form the covert dot pattern. In addition, the designated pixels may be adjusted in a manner to produce a covert dot pattern that may not be readily detectable by the unaided human eye.

At 442, the method 430 may include printing, by the controller, the markings. In some examples, after the paged description language is rendered, the object type image is determined, and the controller has designated pixels to create the covert dot pattern the printing device may print the markings and/or representation(s) on a sheet of print medium. In addition, the controller may cause the printing device to print the markings and/or representation(s) on print medium as the covert dot pattern is embedded into the object type image.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

It should be understood that the descriptions of various examples may not be drawn to scale and thus, the descriptions may have a different size and/or configuration other than as shown therein.

What is claimed:

1. A system, comprising:
    a printing device including hardware to form markings on a print medium;
    a memory resource; and
    a controller to:
        receive a print job to form the markings on the print medium;
        designate a pixel of the received print job to form a covert dot pattern on the markings, wherein the pixel corresponds to a first laser intensity level; and
        adjust a laser intensity of the printing device to a second laser intensity level based on the first laser intensity level of the designated pixel to form the covert dot pattern.

2. The printing device of claim 1, further comprising instructions to determine an object type image of the print job by rendering a page description language of the print job.

3. The printing device of claim 1, wherein the printing device is a monochrome printer.

4. The printing device of claim 1, wherein the designated pixel has a threshold laser intensity level value.

5. The printing device of claim 4, wherein the memory resource is to store a laser intensity level conversion table, wherein the laser intensity level conversion table includes information to adjust laser intensity levels of the designated pixels based on the threshold laser intensity level value.

6. The printing device of claim 5, the controller is to adjust the laser intensity level of the designated pixel based on the laser intensity level conversion table and the threshold value of the designated pixel.

7. A non-transitory machine-readable medium storing instructions that, when executed by a processing resource, cause the processing resource to:
    receive a print job to form markings on a print medium;
    determine an object type image by rendering a page description language of the print job;
    designate a pixel to form a covert dot pattern based on the determination of the object type image, wherein the pixel corresponds to a first laser intensity level; and
    adjust a laser intensity of the printing device to a second laser intensity level based on the first laser intensity level of the designated pixel to form the covert dot pattern.

8. The medium of claim 7, further comprising printing the markings on the print medium, wherein the markings include the covert dot pattern.

9. The medium of claim 7, wherein the second laser intensity level is greater than the first laser intensity level.

10. The medium of claim 7, wherein the wherein the first laser intensity is greater than the second laser intensity level.

11. The medium of claim 7, further including instructions to input a threshold laser intensity level value information into a laser intensity level conversion table to determine the covert dot pattern.

12. A method, comprising:
   receiving, by a controller, a print job to form markings on a print medium;
   determining, by the controller, an object type image to form markings;
   designating, by the controller, a pixel of the object type to form a covert dot pattern, where the pixel corresponds to first laser intensity level;
   adjusting, by the controller, a laser intensity of the printing device to a second laser intensity level based on the first laser intensity level of the designated pixel to form the covert dot pattern; and
   printing, by the controller, the markings on the print medium.

13. The method of claim 12, further comprising rendering a monochrome data of the print job, wherein the rendering of the monochrome data of the print job occurs after designating the pixel.

14. The method of claim 12, wherein embedding the covert dot pattern into the designated pixel of the object type image occurs at a same time as printing.

15. The method of claim 12, further comprising determining whether the designated pixel is an image pixel or a non-image pixel.

* * * * *